United States Patent
Nishikawa et al.

(10) Patent No.: US 10,688,480 B2
(45) Date of Patent: Jun. 23, 2020

(54) EXHAUST GAS-PURIFYING COMPOSITION

(71) Applicant: MITSUI MINING & SMELTING CO., LTD., Tokyo (JP)

(72) Inventors: Jo Nishikawa, Saitama (JP); Satoshi Watanabe, Saitama (JP); Michitaka Yamaguchi, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 16/078,427

(22) PCT Filed: Jul. 26, 2017

(86) PCT No.: PCT/JP2017/027123
§ 371 (c)(1),
(2) Date: Aug. 21, 2018

(87) PCT Pub. No.: WO2018/131195
PCT Pub. Date: Jul. 19, 2018

(65) Prior Publication Data
US 2019/0083965 A1 Mar. 21, 2019

(30) Foreign Application Priority Data
Jan. 13, 2017 (JP) .................................. 2017-003958

(51) Int. Cl.
| | |
|---|---|
| *B01J 29/85* | (2006.01) |
| *B01J 20/18* | (2006.01) |
| *B01J 29/70* | (2006.01) |
| *F01N 3/10* | (2006.01) |
| *B01D 53/92* | (2006.01) |
| *F01N 3/08* | (2006.01) |
| *B01D 53/94* | (2006.01) |
| *B01J 20/28* | (2006.01) |

(52) U.S. Cl.
CPC .............. *B01J 29/85* (2013.01); *B01D 53/92* (2013.01); *B01D 53/94* (2013.01); *B01J 20/18* (2013.01); *B01J 20/28* (2013.01); *B01J 29/70* (2013.01); *B01J 29/7007* (2013.01); *B01J 29/7057* (2013.01); *F01N 3/08* (2013.01); *F01N 3/10* (2013.01); *B01D 2255/502* (2013.01); *B01D 2255/912* (2013.01); *B01D 2257/702* (2013.01); *B01D 2258/01* (2013.01); *F01N 2330/06* (2013.01); *F01N 2370/04* (2013.01)

(58) Field of Classification Search
None
See application file for complete search history.

(56) References Cited

U.S. PATENT DOCUMENTS

| | | | |
|---|---|---|---|
| 4,985,210 A | 1/1991 | Minami | |
| 7,695,703 B2 | 4/2010 | Sobolevskiy | |
| 10,239,049 B2* | 3/2019 | Gaffney | B01J 29/064 |
| 2001/0008624 A1* | 7/2001 | Takahashi | B01D 53/02 |
| | | | 423/716 |
| 2003/0012707 A1 | 1/2003 | Yamamoto | |
| 2008/0261803 A1* | 10/2008 | Luo | B01J 29/7057 |
| | | | 502/74 |
| 2009/0196813 A1 | 8/2009 | Sobolevskiy | |
| 2011/0207598 A1* | 8/2011 | Mitsui | B01D 53/9418 |
| | | | 502/66 |
| 2013/0064758 A1* | 3/2013 | Yilmaz | C01B 39/46 |
| | | | 423/709 |
| 2015/0367336 A1* | 12/2015 | Trukhan | B01J 29/763 |
| | | | 423/239.2 |

FOREIGN PATENT DOCUMENTS

| | | | |
|---|---|---|---|
| CN | 106145136 | * | 11/2016 |
| JP | H07256114 A | | 10/1995 |
| JP | 1190226 A2 | | 4/1999 |
| JP | 2001149787 | * | 11/1999 |
| JP | H11300211 A | | 11/1999 |
| JP | 2000126590 A | | 5/2000 |
| JP | 2001149787 A2 | | 6/2001 |
| JP | 2003071250 A | | 3/2003 |
| JP | 2011510808 | | 4/2011 |
| JP | 2012239924 A | | 12/2012 |
| JP | 2015196115 A | | 11/2015 |

OTHER PUBLICATIONS

International Search Report dated Oct. 3, 2017 filed in PCT/JP2017/027123.

* cited by examiner

*Primary Examiner* — Sheng H Davis
(74) *Attorney, Agent, or Firm* — Rankin, Hill & Clark LLP

(57) ABSTRACT

An exhaust gas purifying composition of the present invention contains zeolite that is BEA zeolite having an $SiO_2/Al_2O_3$ molar ratio of greater than 25 and 600 or less and containing phosphorus. Furthermore, the exhaust gas purifying composition preferably contains zirconium in addition to phosphorus. Furthermore, the zeolite has an $SiO_2/Al_2O_3$ molar ratio of from 30 to 150. The present invention provides an exhaust gas purifying composition having excellent HC adsorbability for exhaust gas purification in internal combustion engines such as gasoline engines.

8 Claims, 1 Drawing Sheet

EXHAUST GAS-PURIFYING COMPOSITION

TECHNICAL FIELD

The present invention relates to an exhaust gas purifying composition containing zeolite.

BACKGROUND ART

Exhaust gas emitted from internal combustion engines such as gasoline engines and diesel engines of automobiles and motorbikes (alternatively referred to as "saddled vehicles") contains harmful components such as hydrocarbon (HC), carbon monoxide (CO), nitrogen oxide (NOx), and the like. In particular, the purification of HC using a catalyst is significantly affected by the exhaust gas temperature, and, generally, a high temperature of 300° C. or more is required. Accordingly, when the exhaust gas temperature is low immediately after an internal combustion engine is started, it is difficult to purify HC using a catalyst. Moreover, immediately after an internal combustion engine is started, a large amount of HC tends to be emitted, and the proportion of HC in the entire emission amount is large when the exhaust gas temperature is low. Thus, the removal of HC from an internal combustion engine immediately after an internal combustion engine is started is a conventional problem.

Patent Literature 1 describes use of a proton zeolite such as mordenite, as an HC adsorbent. Furthermore, Patent Literature 2 describes the use of $Cu^{2+}$ exchange CHA zeolite, as a selective contact reduction catalyst for exhaust gas purification. Furthermore, Patent Literature 3 describes the use of phosphorus-supporting zeolite, as a catalytic cracking catalyst for hydrocarbons.

CITATION LIST

Patent Literature

Patent Literature 1: U.S. Pat. No. 4,985,210A
Patent Literature 2: JP 2015-196115A
Patent Literature 3: JP 2012-239924A

SUMMARY OF INVENTION

However, the proton zeolite as described in Patent Literature 1 is not sufficiently hydrothermally stable, and thus, if it is used for exhaust gas purification in internal combustion engines such as gasoline engines, sufficient HC adsorbability cannot be obtained. Furthermore, when using CHA zeolite as in Patent Literature 2, toluene, which is contained in a particularly large amount among the HC molecular species in the emission, cannot be adsorbed, and thus excellent HC purifiability cannot be obtained.

Meanwhile, the technique described in Patent Literature 3 uses phosphorus-containing zeolite merely for cracking hexane or the like at approximately 550° C. This document neither describes nor suggests the use of phosphorus-containing zeolite for exhaust gas purification applications where resistance to high temperatures such as 900 to 1000° C. is required, and, furthermore, neither describes nor suggests any specific configuration required of the zeolite in such applications.

It is an object of the present invention to provide an exhaust gas purifying composition that can solve various disadvantages of conventional techniques described above.

The present invention provides an exhaust gas purifying composition including BEA zeolite which has an $SiO_2/Al_2O_3$ molar ratio of greater than 25 and 600 or less and which contains phosphorus.

DESCRIPTION OF EMBODIMENT

Figure 1A:
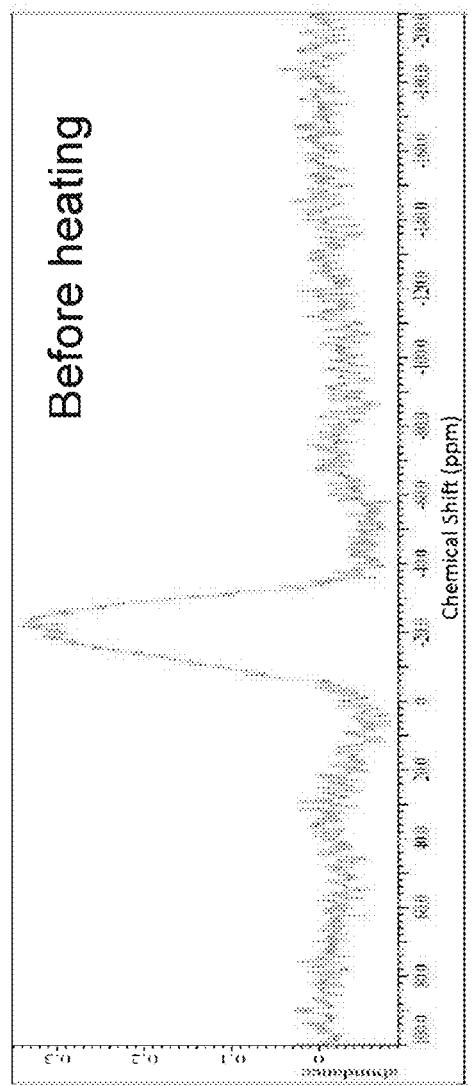
FIG. 1(a) and FIG. 1(b) are $^{31}$P-NMR charts before and after a heat resistance test was carried out on an exhaust gas purifying composition of Example 1.

Hereinafter, the present invention will be described based on a preferred embodiment thereof.

An exhaust gas purifying composition of this embodiment contains zeolite. Zeolite refers to a crystalline substance in which $TO_4$ units (T is a central atom) having a tetrahedron structure are covalently bonded to each other via O atoms in a three-dimensional manner and form open regular micropores. Specific examples thereof include silicate, germanate, arsenate, and the like listed in the Structure Commission Database of the International Zeolite Association (hereinafter, also may be referred to as "IZA").

Examples of silicate include aluminosilicate, gallosilicate, phyllosilicate, titanosilicate, and borosilicate, examples of germanate include aluminogermanate, and examples of arsenate include aluminoarsenate. These examples include structures obtained by substituting Si or Al in the framework with a divalent or trivalent cation of Ti, Ga, Mg, Mn, Fe, Co, Zn, or the like. In this embodiment, it is preferable to use crystalline aluminosilicate as the zeolite.

The exhaust gas purifying composition contains BEA zeolite as the zeolite. BEA zeolite typically has a pore diameter of approximately 0.65 nm, and using BEA zeolite makes the composition excellent in terms of adsorbability for toluene, which is contained in a large amount as an HC molecular species in the exhaust gas. The pore diameter refers to a crystallographic free diameter of the channels as defined by IZA. The pore diameter refers to an average diameter when the pores (channels) are each in the shape of a perfect circle, and refers to a shorter axis when the pores are each in a shape that is elongated in one direction as in an ellipse.

The BEA zeolite used in this embodiment may be either synthetic zeolite or natural zeolite as long as it has a specific $SiO_2/Al_2O_3$ molar ratio, and there is no particular limitation on the method for producing BEA zeolite when it is synthetic zeolite.

The inventor of the present invention conducted an in-depth study on a method that, in a case where zeolite is used as an exhaust gas purifying composition, allows the composition to exert high HC adsorbability even under a severe heat environment. As a result, the inventor found that, if BEA zeolite has a $SiO_2/Al_2O_3$ molar ratio within a specific range and contains phosphorus, the HC adsorbability after exposure to a hydrothermal environment can be significantly improved compared with conventional cases.

Specifically, if phosphorus-containing BEA zeolite contained in an exhaust gas purifying composition has an $SiO_2/Al_2O_3$ molar ratio of greater than 25, an effect of improving the thermal resistance is sufficiently exerted because phosphorus effectively acts to maintain the BEA structure of zeolite even when subjected to high temperatures, and the HC adsorbability becomes far superior to that of phosphorus-containing BEA zeolite having an $SiO_2/Al_2O_3$ molar ratio of 25 or less. If the $SiO_2/Al_2O_3$ molar ratio of the BEA zeolite is 600 or less, high HC adsorbing activity can be exerted. In order to increase these effects, the $SiO_2/Al_2O_3$ molar ratio of the BEA zeolite is more preferably from 28 to 200, even more preferably from 30 to 200, still more preferably from 30 to 150, and most preferably from 30 to 100, The $SiO_2/Al_2O_3$ molar ratio of the BEA zeolite can be measured using the method in the examples, which will be described later.

As described above, the BEA zeolite contains phosphorus. The phosphorus is preferably supported by the BEA zeolite. The state in which phosphorus is supported by the BEA zeolite refers to a state of being physically or chemically adsorbed or held on the outer surface of the BEA zeolite or the inner surface of the pores. The chemical adsorption also includes ionic bonding.

The amount of phosphorus in the exhaust gas purifying composition is such that its molar ratio (P/Al) with respect to Al in the BEA zeolite is preferably 0.5 or greater, because the effect of maintaining the BEA structure of zeolite even under a severe heat environment and obtaining high HC adsorbability, derived from the presence of phosphorus, can be easily obtained. Furthermore, the amount of phosphorus is such that its molar ratio (P/Al) with respect to Al in the BEA zeolite is preferably 10 or less, because the zeolite pores can be prevented from being blocked by the phosphorus. From these points of view, the amount of phosphorus in the exhaust gas purifying composition is such that its molar ratio (P/Al) with respect to Al in the BEA zeolite is more preferably from 0.5 to 5, and even more preferably from 1 to 3. The molar ratio (P/Al) can be measured using the method in the examples, which will be described later.

The BEA zeolite in the exhaust gas purifying composition contains zirconium in addition to phosphorus, and thus the composition is particularly effective for maintaining the BEA structure of zeolite when exposed to high temperatures, and the HC adsorbability when used for exhaust gas purification in a gasoline engine and the like can be further improved. The amount of zirconium contained in the exhaust gas purifying composition is such that its molar ratio (Zr/Al) with respect to Al in the zeolite is preferably 0.25 or greater, because the effect of improving the HC adsorbability, derived from the presence of zirconium, can be easily obtained. Furthermore, the amount of zirconium is such that its molar ratio (Zr/Al) with respect to Al in the zeolite is preferably 5 or less. From these points of view, the amount of zirconium is such that its molar ratio (Zr/Al) with respect to Al in the zeolite is more preferably from 0.25 to 4, even more preferably from 0.25 to 2, still more preferably from 0.25 to 1, and especially preferably from 0.5 to 1. The molar ratio (Zr/Al) can be measured using the method in the examples, which will be described later.

The zirconium is preferably supported by the zeolite. The state in which zirconium is supported by the zeolite refers to a state of being physically or chemically adsorbed or held on the outer surface of the zeolite or the inner surface of the pores. The chemical adsorption also includes ionic bonding.

When the exhaust gas purifying composition of this embodiment after being heated at 980° C. for 25 hours is subjected to $^{31}$P-NMR measurement using an 85% by mass $H_3PO_4$ aqueous solution as the standard, a peak may be observed in the range of −35 to −20 ppm, and more preferably −34 to −21 ppm. This peak is derived from an Al—O—P bond of the phosphorus-containing BEA zeolite. Furthermore, in the case where the exhaust gas purifying composition of this embodiment contains zirconium, when the composition after being heated at 980° C. for 25 hours is subjected to the $^{31}$P-NMR measurement, a peak may also be observed in the range of −50 to −35 ppm, and more preferably −49 to −36 ppm, as well. This peak is derived from a Zr—O—P bond of the phosphorus-containing BEA zeolite. However, these peaks do not prescribe the state of P or Zr in the exhaust gas purifying composition before being heated.

The heating corresponds to a hydrothermal stability test that is performed under Heat Resistance Test Conditions in the examples, which will be described later. As is described in the conditions of the test, the thermal resistance in this specification includes moist heat resistance. $^{31}$P-NMR measurement is performed using the method in the examples, which will be described later.

The zeolite may contain other elements in addition to P and Zr. As such elements, rare earth elements, transition metal elements other than rare earth elements, alkaline earth metal elements, alkali metal elements, other metal elements, semiconductor elements, and the like may be used without any particular limitation.

The exhaust gas purifying composition is such that, when (a1) a specific surface area after heating at 980° C. for 25 hours is taken as A, and (a2) a specific surface area before heating is taken as B, a specific surface area maintaining factor represented by A/B×100(%) is preferably 35% or greater. This maintaining factor indicates the heat resistance of the exhaust gas purifying composition. The exhaust gas purifying composition preferably has a maintaining factor of 35% or greater, because high heat resistance allows the HC adsorbability to be maintained. From these points of view, the specific surface area maintaining factor is more preferably 40% or greater, and even more preferably 50% or greater. The heating can be performed using the method in the examples, which will be described later. The specific surface areas can be measured using the method in the examples, which will be described later. The exhaust gas purifying composition whose maintaining factor is within the above-described range can be produced using a preferred production method, which will be described later.

In the exhaust gas purifying composition, the specific surface area B before heating is preferably 200 m$^2$/g or greater, more preferably 300 m$^2$/g or greater, and even more preferably 500 m$^2$/g or greater, because good HC adsorbability can be more easily obtained. Furthermore, the specific surface area A after heating is preferably 150 m$^2$/g or greater, and more preferably 300 m$^2$/g or greater, because good HC adsorbability can be more easily obtained. The specific surface areas can be measured using the method in the examples, which will be described later.

Hereinafter, a preferred method for producing the exhaust gas purifying composition of this embodiment will be described.

A preferred method for producing the exhaust gas purifying composition of this embodiment includes a first step of preparing a dispersion or solution in which phosphorus is dispersed or dissolved in a liquid medium, a second step of bringing BEA zeolite into contact with dispersion or solution, and a third step of firing an obtained treated material.

If the exhaust gas purifying composition is to contain zirconium and other elements in addition to phosphorus, in the first step, it is preferable to disperse or dissolve zirconium and other elements in addition to phosphorus in the liquid medium.

First Step

Examples of phosphorus that is dispersed or dissolved in the liquid medium include phosphoric acid and salts thereof. Examples of phosphoric acid include orthophosphoric acid ($H_3PO_4$), pyrophosphoric acid ($H_4P_2O_7$), triphosphoric acid ($H_5P_3O_{10}$), polyphosphoric acid, metaphosphoric acid ($HPO_3$), and ultraphosphoric acid. Furthermore, examples of phosphate include orthophosphate, pyrophosphate, triphosphate, polyphosphate, metaphosphate, and ultraphosphate. Examples of salts thereof include alkali metal salts, other metal salts, and ammonium salts.

Preferable examples of e liquid medium include water.

If zirconium is used in the first step, it is preferable to disperse or dissolve a water-soluble zirconium salt in the liquid medium. Preferable examples of the water-soluble zirconium salt include zirconium chloride ($ZrCl_4$), zirconium oxychloride ($ZrOCl_2.nH_2O$), zirconium sulfate ($Zr(SO_4)_2.nH_2O$), zirconium oxysulfate ($ZrOSO_4.nH_2O$), zirconium nitrate ($Zr(NO_3)_4.nH_2O$), zirconium oxynitrate ($ZrO(NO_3)_2.nH_2O$), zirconium diacetate ($Zr(CH_3COO)_2$), zirconium tetraacetate ($Zr(CH_3COO)_4$), zirconium oxyacetate ($ZrO(CH_3COO)_2$), ammonium zirconium carbonate (($NH_4)_2ZrO(CO_3)_2$), and zirconium alkoxide.

The amount of phosphorus in the dispersion or the solution is such that, for example, if phosphorus is contained as orthophosphoric acid ions, the number of moles of orthophosphoric acid ions is preferably from 0.005 to 3 mol/L, and more preferably from 0.01 to 2 mol/L. In the case where the dispersion or the solution further contains zirconium, the amount of zirconium in the dispersion or the solution is such that the number of moles of zirconium ions is preferably from 0.005 to 1.5 mol/L, and more preferably from 0.01 to 1 mol/L.

Second Step

In the second step, as BEA zeolite that is brought into contact with the dispersion or solution, it is preferable to use those in which the $SiO_2/Al_2O_3$ molar ratio is within the above-described preferable range of the phosphorus-containing BEA zeolite. Furthermore, it is more preferable to use those in which the specific surface area is the same as or greater than the above-described preferable lower limit of the specific surface area of the phosphorus-containing BEA zeolite prior to being heated. The zeolite that is brought into contact with the dispersion or solution may be of a proton-type, a sodium-type, an ammonium-type, or the like, and is preferably a proton-type.

The contact treatment may be performed by spraying the dispersion or solution onto the BEA zeolite, or by immersing the BEA zeolite in the dispersion or solution. During immersion, the BEA zeolite may be or may not be stirred in the dispersion or the solution. When bringing the BEA zeolite into contact with the dispersion or solution, the proportion of the BEA zeolite with respect to 100 parts by mass of the dispersion or solution is preferably from 1 to 40 parts by mass, and more preferably from 2 to 30 parts by mass.

The contact treatment between the BEA zeolite and the dispersion or solution may be performed at room temperature, or under a heated condition. The temperature for the contact treatment is preferably from 5 to 200° C., and more preferably from 10 to 100° C.

Third Step

In the third step, a treated material obtained in the contact treatment of the second step is fired. Typically, the firing is preferably performed on a dried material obtained by drying a solid obtained through filtering of a slurry obtained in the second step. It is sufficient that the drying is performed until moisture has substantially disappeared, and is performed, for example, at 100° C. or more for about a few to 10 or plus hours.

The firing is performed, for example, under atmospheric pressure in view of processes and cost. Furthermore, the firing temperature is preferably 400° C. or more, in order to allow phosphorus to be stably contained in the BEA zeolite, and to remove unnecessary raw materials. The firing temperature is preferably 1100° C. or less, and more preferably 1000° C. or less, in order to maintain the zeolite structure. From these points of view, the firing temperature is more preferably from 500 to 700° C. Given that the firing temperature is within the above-described range, the firing time is preferably from 1 to 5 hours, and more preferably from 2 to 4 hours.

The thus obtained exhaust gas purifying composition containing BEA zeolite which has the specific $SiO_2/Al_2O_3$ molar ratio and which contains phosphorus maintains the BEA structure of zeolite, and exerts stable HC adsorbability, even when exposed to high temperatures of approximately from 900 to 1100° C. (in particular 1000° C. or less). Such an exhaust gas purifying composition can exert stable and high exhaust gas purifiability, as a catalyst for exhaust gas purification in internal combustion engines such as gasoline engines or diesel engines using a fossil fuel as a motive power source. In particular, the exhaust gas purifying composition of this embodiment is preferably used to purify exhaust gas emitted from gasoline engines such as automobiles or motorbikes, due to its high thermal resistance. The exhaust gas purifying composition of this embodiment is effectively used to remove elements in exhaust gas, especially hydrocarbon (HC).

Accordingly, the present invention also provides an exhaust gas purification method using the exhaust gas purifying composition of the present invention, and more preferably an exhaust gas purification method for removing hydrocarbon contained in exhaust gas emitted into exhaust passages of internal combustion engines.

The exhaust gas purifying composition of this embodiment may be in any form such as a powder, paste, or a granule, For example, the exhaust gas purifying composition of this embodiment can be used as a catalyst layer formed on a catalyst support. This catalyst support is made of, for example, a ceramic or a metal material. Furthermore, there is no particular limitation on the shape of the catalyst support, but is typically in the shape of honeycomb, plates, pellets, a DPF, a GPF, or the like, and is preferably in the shape of honeycomb, a DPF, or a GPF. Furthermore, examples of the material for the catalyst support include ceramics such as alumina ($Al_2O_3$), mullite ($3Al_2O_3 \cdot 2SiO_2$), cordierite ($2MgO-2Al_2O_3-5SiO_2$), aluminum titanate ($Al_2TiO_5$), and silicon carbide (SiC), and metal materials such as stainless steel.

Furthermore, the exhaust gas purifying composition of this embodiment may be used as a catalyst layer formed on a catalyst support as described above, and then, on the catalyst layer, a catalyst layer made of a conventionally known catalyst material may be stacked. Conversely, a catalyst layer made of a conventionally known catalyst material may be stacked on a catalyst support, and then, on the catalyst layer, a catalyst layer containing the exhaust gas purifying composition of this embodiment may be formed. Furthermore, a catalyst layer in which the exhaust gas purifying composition of this embodiment and a conventionally known catalyst material are mixed may be formed on a catalyst support.

EXAMPLES

Hereinafter, the present invention will be described in more detail by way of examples. However, the scope of the present invention is not limited to these examples. Unless otherwise described, "%" refers to "% by mass". In the examples and comparative examples below, crystalline aluminosilicate was used as raw material zeolite.

Example 1

1.05 g of phosphoric acid ($H_3PO_4$) and 2.45 g of zirconium oxynitrate ($ZrO(NO_3)_2 \cdot 2H_2O$) were suspended in 50 g of pure water. 10 g of proton-type BEA zeolite ($SiO_2/Al_2O_3$ molar ratio 35, specific surface area 660 $m^2/g$) was put into the obtained suspension, and stirred at room temperature (20° C.) for 4 hours. The obtained slurry was filtered, dried at 120° C. for 12 hours, and then fired under atmospheric pressure at 600° C. for 3 hours, and thus a powder-like exhaust gas purifying composition was obtained.

Example 2

A powder-like exhaust gas purifying composition was obtained as in Example 1, except that the amount of phosphoric acid was changed to 0.525 g.

Example 3

A powder-like exhaust gas purifying composition was obtained as in Example 1, except that the amount of phosphoric acid was changed to 2.10 g.

Example 4

A powder-like exhaust gas purifying composition was obtained as in Example 1, except that the amount of phosphoric acid was changed to 4.20 g.

Example 5

0.38 g of phosphoric acid ($H_3PO_4$) and 0.88 g of zirconium oxynitrate ($ZrO(NO_3)_2 \cdot 2H_2O$) were suspended in 50 g of pure water. 10 g of proton-type BEA zeolite ($SiO_2/Al_2O_3$ molar ratio 100, specific surface area 605 $m^2/g$) was put into the obtained suspension, and stirred at room temperature (20° C.) for 4 hours. The obtained slurry was filtered, dried at 120° C. for 12 hours, and then fired under atmospheric pressure at 600° C. for 3 hours, and thus a powder-like exhaust gas purifying composition was obtained.

Example 6

0.08 g of phosphoric acid ($H_3PO_4$) and 0.18 g of zirconium oxynitrate ($ZrO(NO_3)_2 \cdot 2H_2O$) were suspended in 50 g of pure water. 10 g of proton-type BEA zeolite ($SiO_2/Al_2O_3$ molar ratio 500, specific surface area 555 $m^2/g$) was put into the obtained suspension, and stirred at room temperature (20° C.) for 4 hours. The obtained slurry was filtered, dried at 120° C. for 12 hours, and then fired under atmospheric pressure at 600° C. for 3 hours, and thus a powder-like exhaust gas purifying composition was obtained.

Example 7

A powder-like exhaust gas purifying composition was obtained as in Example 1, except that zirconium oxynitrate was not used.

Comparative Example 1

1.44 g of phosphoric acid ($H_3PO_4$) and 3.37 g of zirconium oxynitrate ($ZrO(NO_3)_2 \cdot 2H_2O$) were suspended in 50 g of pure water. 10 g of proton-type BEA zeolite ($SiO_2/Al_2O_3$ molar ratio 25, specific surface area 600 $m^2/g$) was put into the obtained suspension, and stirred at room temperature (20° C.) for 4 hours. The obtained slurry was filtered, dried at 120° C. for 12 hours, and then fired under atmospheric pressure at 600° C. for 3 hours, and thus a powder-like exhaust gas purifying composition was obtained.

Comparative Example 2

A powder-like exhaust gas purifying composition was obtained as in Example 1, except that phosphoric acid and zirconium oxynitrate were not used.

Comparative Example 3

A powder-like exhaust gas purifying composition was obtained as in Comparative Example 2, except that proton-type BEA zeolite ($SiO_2/Al_2O_3$ molar ratio 500, specific surface area 555 $m^2/g$) was used as BEA zeolite.

Comparative Example 4

A powder-like exhaust gas purifying composition was obtained as in Example 1, except that phosphoric acid was not used.

Comparative Example 5

1.25 g of phosphoric acid ($H_3PO_4$) and 2.93 g of zirconium oxynitrate ($ZrO(NO_3)_2 \cdot 2H_2O$) were suspended in 50 g of pure water. 10 g of CHA zeolite (SSZ13, pore diameter 0.4 nm, $SiO_2/Al_2O_3$ molar ratio 29, specific surface area 650 $m^2/g$) was put into the obtained suspension, and stirred at room temperature (20° C.) for 4 hours. The obtained slurry was filtered, dried at 120° C. for 12 hours, and then fired under atmospheric pressure at 600° C. for 3 hours, and thus a powder-like exhaust gas purifying composition was obtained.

Comparative Example 6

3.77 g of phosphoric acid ($H_3PO_4$) and 4.41 g of zirconium oxynitrate ($ZrO(NO_3)_2 \cdot 2H_2O$) were suspended in 50 g of pure water. 10 g of CHA zeolite (SAPO34, pore diameter 0.4 nm, $SiO_2/Al_2O_3$ molar ratio 0.4, specific surface area 630 $m^2/g$) was put into the obtained suspension, and stirred at room temperature (20° C.) for 4 hours. The obtained slurry was filtered, dried at 120° C. for 12 hours, and then fired under atmospheric pressure at 600° C. for 3 hours, and thus a powder-like exhaust gas purifying composition was obtained.

Each of the exhaust gas purifying compositions obtained in Examples 1 to 7 and Comparative Examples 1 to 6 (zeolite containing or not containing phosphorus) was evaluated as follows. Table 1 below shows the results.

$SiO_2/Al_2O_3$ Molar Ratio

An Si amount and an Al amount in the exhaust gas purifying composition were measured using an X-ray fluorescence spectrometer (model number: ZSX Primus II) manufactured by Rigaku Corporation as a composition analyzer. A measurement sample was prepared as follows. An $SiO_2/Al_2O_3$ molar ratio was calculated from the obtained Si amount and Al amount.

Method for Preparing Measurement Sample

A measurement sample was prepared by placing and compression-molding the exhaust gas purifying composition into a vinyl chloride tube with a diameter of 30 mm.

Phosphorus Content and Zirconium Content

A P amount, a Zr amount, and an Al amount in the exhaust gas purifying composition were measured using an X-ray fluorescence spectrometer (model number: ZSX Primus II) manufactured by Rigaku Corporation as a composition analyzer. A measurement sample was prepared as follows. A molar ratio (P/Al) was calculated from the obtained measured values, and taken as a P content with respect to Al in the zeolite. Also, a molar ratio (Zr/Al) was calculated from the obtained measured values, and taken as a Zr content with respect to Al in the zeolite.

Method for Preparing Measurement Sample

A measurement sample was prepared by placing and compression-molding the exhaust gas purifying composition into a vinyl chloride tube with a diameter of 30 mm.

Specific Surface Area Maintaining Factor

A specific surface area B $m^2/g$ of the exhaust gas purifying composition before a heat resistance test was performed under the following conditions and a specific surface area A $m^2/g$ thereof after the test were measured. Then, a specific surface area maintaining factor was obtained as A/B×100(%). The specific surface areas were obtained according to the 3-point BET method using a specific surface area/pore distribution analyzer (model number: QUADRASORB SI) manufactured by Quantachrome Instruments. Helium was used as the gas for the measurement.

Heat Resistance Test Conditions

The following cycle was performed at 980° C.×25 hours in a 10% by volume $H_2O$ atmosphere.

Cycle: Model gas with the following composition at 3 L/min for 80 secs, and air at 3 L/min for 20 secs were alternately supplied.

Model gas composition: The composition contains $C_3H_6$ 70 mL/min, $O_2$ 70 mL/min, and $N_2$ as a balance.

10% by volume $H_2O$ was evaporated from a water-containing tank, and mixed into the model gas or air as vapor. The saturated vapor pressure was adjusted through temperature, so that the above-described vapor amount in % by volume was obtained.

Figure 1B:
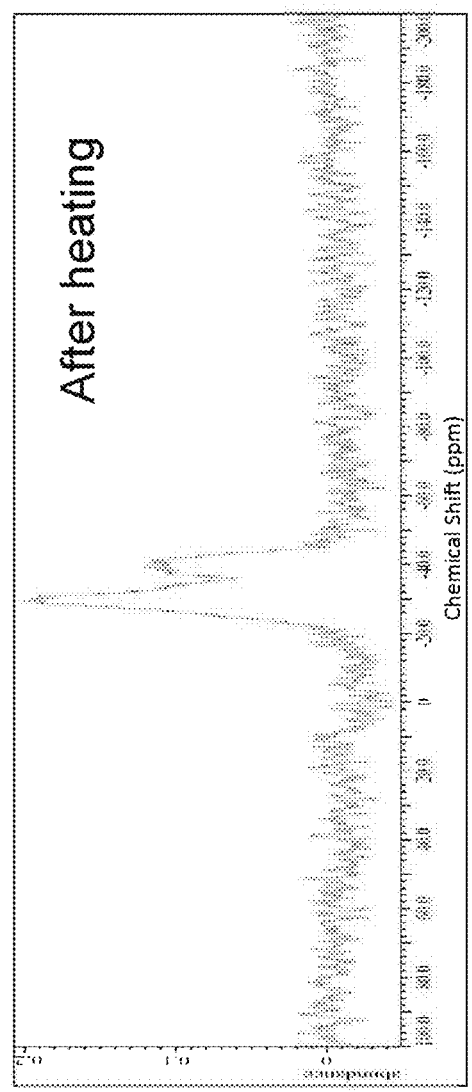

The exhaust gas purifying composition in Example 1 was subjected to $^{31}P$-NMR measurement before and after the heat resistance test. FIG. 1 shows the results.

$^{31}P$-NMR Measurement Conditions

The exhaust gas purifying composition that was to be measured was set in a zirconium oxide sample tube with a diameter of 6 mm, and measured using an ECA400 manufactured by JEOL Ltd. under the following conditions.

85% $H_3PO_4$ aqueous solution was used as the standard, and taken as 0 ppm. Sample spinning speed: 7 kHz, pulse: 90 degrees, repetition time: 30 seconds, and number of acquisition: 64 times Toluene Adsorbability 200 mg of each of the exhaust gas purifying compositions obtained in the examples and the comparative examples that had been subjected to the heat resistance test under the above-described conditions was filled into a flow reactor, and flowed with evaluation gas having the composition below at 50° C. and at a flow rate 30 L/min for 30 minutes to adsorb toluene. Toluene was desorbed using the temperature-programmed desorption method, and the toluene desorption amount was measured using a mass spectrometer. Table 1 shows the amount in an arbitrary unit when the toluene adsorption amount in Example 1 is taken as 100%. The temperature-programmed desorption of toluene was performed using a fully automated chemisorption analyzer AutoChem II 2920 manufactured by Micromeritics, and the desorption amount was measured using an AutoChem Cirrus 2 manufactured by Micromeritics.

Composition of the evaluation gas for toluene adsorbability: The gas contains toluene 0.1% by volume, and He as a balance.

TABLE 1

| | Zeolite type | SiO$_2$/Al$_2$O$_3$ molar ratio | P/Al | Zr/Al | Specific surface area before heating m$^2$/g B | Specific surface area after heating m$^2$/g A | Specific surface area maintaining factor A/B | Toluene adsorption amount (a.u.) |
|---|---|---|---|---|---|---|---|---|
| Ex. 1 | BEA | 35 | 1 | 1 | 571.6 | 339.0 | 59.3% | 100.0 |
| Ex. 2 | BEA | 35 | 0.5 | 1 | 611.5 | 234.4 | 38.3% | 71.7 |
| Ex. 3 | BEA | 35 | 2 | 1 | 513.1 | 304.7 | 59.4% | 117.8 |
| Ex. 4 | BEA | 35 | 4 | 1 | 264.6 | 152.6 | 57.7% | 75.9 |
| Ex. 5 | BEA | 100 | 1 | 1 | 574.7 | 381.3 | 66.3% | 95.0 |
| Ex. 6 | BEA | 500 | 1 | 1 | 564.9 | 374.6 | 66.3% | 64.6 |
| Ex. 7 | BEA | 35 | 1 | 0 | 616.9 | 272.0 | 44.1% | 76.9 |
| Com. Ex. 1 | BEA | 25 | 1 | 1 | 493.6 | 202.0 | 40.9% | 14.5 |
| Com. Ex. 2 | BEA | 35 | 0 | 0 | 663.9 | 19.3 | 2.9% | 0.0 |
| Com. Ex. 3 | BEA | 500 | 0 | 0 | 555.2 | 312.6 | 56.3% | 61.5 |
| Com. Ex. 4 | BEA | 35 | 0 | 1 | 618.8 | 158.1 | 25.5% | 10.4 |
| Com. Ex. 5 | CHA | 29 | 1 | 1 | 676.2 | 552.9 | 81.8% | 0.0 |
| Com. Ex. 6 | CHA | 0.4 | 1 | 1 | 287.0 | 201.2 | 70.1% | 0.0 |

It is seen from Table 1 that BEA zeolite having the specific SiO$_2$/Al$_2$O$_3$ molar ratio and containing phosphorus can exert high hydrocarbon adsorbability.

On the other hand, it is seen that BEA zeolite containing phosphorus but having an SiO$_2$/Al$_2$O$_3$ molar ratio of 25 or less (Comparative Example 1) and BEA zeolite having an SiO$_2$/Al$_2$O$_3$ molar ratio of greater than 25 and 600 or less but not containing phosphorus (Comparative Examples 2 to 4) are significantly inferior to those in the examples in terms of hydrocarbon adsorbability. Furthermore, it is seen that non-BEA zeolite (Comparative Examples 5 and 6) including that of Comparative Example 5 containing phosphorus and having an SiO$_2$/Al$_2$O$_3$ molar ratio of greater than 25 cannot exert hydrocarbon adsorbability.

As described above, it is clear that, if the composition of the present invention contains BEA zeolite having the specific SiO$_2$/Al$_2$O$_3$ molar ratio and containing phosphorus, synergistic effects of improving the HC adsorbability can be achieved, which is useful for exhaust gas purification.

Example 8

A powder-like exhaust gas purifying composition was obtained as in Example 1, except that the amount of zirconium oxynitrate (ZrO(NO$_3$)$_2$.2H$_2$O) was changed to 0.61 g.

Example 9

A powder-like exhaust gas purifying composition was obtained as in Example 1, except that the amount of zirconium oxynitrate (ZrO(NO$_3$)$_2$.2H$_2$O) was changed to 1.22 g.

The exhaust gas purifying compositions obtained in Examples 8 and 9 were evaluated as in Examples 1 to 7 in terms of the SiO$_2$/Al$_2$O$_3$ molar ratio, the phosphorus content and the zirconium content, the specific surface area maintaining factor, and the toluene adsorbability. Table 2 below shows the results.

TABLE 2

| | Zeolite type | SiO$_2$/Al$_2$O$_3$ molar ratio | P/Al | Zr/Al | Specific surface area before heating m$^2$/g B | Specific surface area after heating m$^2$/g A | Specific surface area maintaining factor A/B | Toluene adsorption amount (a.u.) |
|---|---|---|---|---|---|---|---|---|
| Ex. 8 | BEA | 35 | 1 | 0.25 | 633.4 | 369.7 | 58.4% | 82.71 |
| Ex. 9 | BEA | 35 | 1 | 0.5 | 613.9 | 372.0 | 60.6% | 87.40 |

It is seen from Table 2 that BEA zeolite having the specific SiO$_2$/Al$_2$O$_3$ molar ratio and containing phosphorus can exert high hydrocarbon adsorbability.

INDUSTRIAL APPLICABILITY

The present invention provides an exhaust gas purifying composition having excellent HC adsorbability for exhaust gas purification in internal combustion engines such as gasoline engines.

The invention claimed is:
1. An exhaust gas purification method comprising purifying exhaust gas emitted from a gasoline engine by using a composition comprising BEA zeolite which has an $SiO_2/Al_2O_3$ molar ratio of greater than 25 and 600 or less and which contains phosphorus and zirconium, wherein an amount of the phosphorus contained in the zeolite is such that a molar ratio (P/Al) thereof with respect to Al in the BEA zeolite is 0.5 or greater, an amount of the zirconium contained in the zeolite is such that a molar ratio (Zr/Al) thereof with respect to Al in the zeolite is 0.5 or greater, and the BEA zeolite which contains phosphorus and zirconium has a Zr—O—P bond.

2. The exhaust gas purification method according to claim 1, wherein hydrocarbon contained in exhaust gas emitted into an exhaust passage of the gasoline engine is removed.

3. The exhaust gas purification method according to claim 1, wherein the zeolite has an $SiO_2/Al_2O_3$ molar ratio of from 30 to 150.

4. The exhaust gas purification method according to claim 1, wherein an amount of the zirconium contained in the zeolite is such that a molar ratio (Zr/Al) thereof with respect to Al in the zeolite is from 0.5 to 4.

5. The exhaust gas purification method according to claim 1, wherein the zeolite has an $SiO_2/Al_2O_3$ molar ratio of from 30 to 150, and an amount of the phosphorus contained in the zeolite is such that a molar ratio (P/Al) thereof with respect to Al in the BEA zeolite is from 1 to 3.

6. The exhaust gas purification method according to claim 1, wherein a specific surface area maintaining factor represented by A/B×100(%) is 35% or greater, where A represents a specific surface area after heating at 980° C. for 25 hours, and B represents a specific surface area before heating.

7. The exhaust gas purification method according to claim 1, wherein the composition is a fired material of a mixture of BEA zeolite and a dispersion or solution containing phosphoric acid or salts thereof and a water-soluble zirconium salt.

8. An exhaust gas purification method according to claim 1, comprising purifying exhaust gas emitted from a gasoline engine by using a composition comprising BEA zeolite which has an $SiO_2/Al_2O_3$ molar ratio of greater than 25 and 600 or less and which contains phosphorus and zirconium, wherein an amount of the phosphorus contained in the zeolite is such that a molar ratio (P/Al) thereof with respect to Al in the BEA zeolite is 0.5 or greater, an amount of the zirconium contained in the zeolite is such that a molar ratio (Zr/Al) thereof with respect to Al in the zeolite is 0.5 or greater and 2 or less, and a peak is observed in a range of −21 to −29 ppm in P-NMR measurement of the composition.

* * * * *